(12) United States Patent
Suri et al.

(10) Patent No.: US 10,664,687 B2
(45) Date of Patent: May 26, 2020

(54) RULE-BASED VIDEO IMPORTANCE ANALYSIS

(71) Applicant: Microsoft Technology Licensing, LLC, Redmond, WA (US)

(72) Inventors: Nitin Suri, Redmond, WA (US); Tzong-Jhy Wang, Seattle, WA (US); Omkar Mehendale, Seattle, WA (US); Andrew S. Ivory, Woodinville, WA (US); William D. Sproule, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1056 days.

(21) Appl. No.: 14/303,466

(22) Filed: Jun. 12, 2014

(65) Prior Publication Data

US 2015/0363635 A1 Dec. 17, 2015

(51) Int. Cl.
*G06K 9/00* (2006.01)
*G06T 7/11* (2017.01)
(Continued)

(52) U.S. Cl.
CPC ..... *G06K 9/00268* (2013.01); *G06K 9/00221* (2013.01); *G06K 9/00711* (2013.01);
(Continued)

(58) Field of Classification Search
CPC ...... H04N 9/80; H04N 5/2628; H04N 7/0122; G06F 3/01; G06T 3/4007; A61B 5/103; A61B 5/162
(Continued)

(56) References Cited

U.S. PATENT DOCUMENTS 6,690,725 B1 2/2004 Abdeljaoud et al.
6,964,021 B2 11/2005 Jun et al.
(Continued)

FOREIGN PATENT DOCUMENTS

CN 1264876 A 8/2000
CN 101729784 A 6/2010
(Continued)

OTHER PUBLICATIONS

Abdollahian, et al., "Motion Driven Content Analysis of User Generated", IEEE Transactions on Multimedia, Apr. 2014, 13 pages.
(Continued)

*Primary Examiner* — Thai Q Tran
*Assistant Examiner* — Syed Y Hasan
(74) *Attorney, Agent, or Firm* — Watson Patents, PLC; Vladan M. Vasiljevic

(57) ABSTRACT

The importance of video sections of a video file may be determined from features of the video file. The video file may be decoded to obtain video frames and audio data associated with the video frames. Feature scores for each video frame may be obtained by analyzing features of the video frame or the audio data associated with the video frame based on a local rule, a global rule, or both. The feature scores are further combined to derive a frame importance score for the video frame. Based on the feature scores of the video frames in the video file, the video file may be segmented into video sections of different section importance values.

20 Claims, 7 Drawing Sheets

(51) Int. Cl.
*G11B 27/034* (2006.01)
*G11B 27/28* (2006.01)

(52) U.S. Cl.
CPC ............ *G06K 9/00765* (2013.01); *G06T 7/11* (2017.01); *G11B 27/034* (2013.01); *G11B 27/28* (2013.01)

(58) Field of Classification Search
USPC .................. 386/241; 382/103, 107; 707/769; 715/720, 723; 348/580, 581; 600/595
See application file for complete search history.

(56) References Cited

U.S. PATENT DOCUMENTS

| | | | |
|---|---|---|---|
| 7,143,352 | B2 | 11/2006 | Divakaran et al. |
| 7,836,050 | B2 | 11/2010 | Jing et al. |
| 7,889,794 | B2 | 2/2011 | Luo et al. |
| 8,145,648 | B2 | 3/2012 | Kunjithapatham et al. |
| 8,200,063 | B2 | 6/2012 | Chen et al. |
| 8,619,150 | B2 | 12/2013 | Deever |
| 2002/0167537 | A1 | 11/2002 | Trajkovic |
| 2007/0081586 | A1 | 4/2007 | Raveendran et al. |
| 2007/0169613 | A1* | 7/2007 | Kim ........................ G10H 1/00 84/609 |
| 2008/0019661 | A1 | 1/2008 | Obrador et al. |
| 2009/0115864 | A1 | 5/2009 | Ogawa |
| 2010/0005485 | A1 | 1/2010 | Tian et al. |
| 2010/0054705 | A1 | 3/2010 | Okamoto et al. |
| 2010/0070523 | A1* | 3/2010 | Delgo ................. G06F 17/3079 707/769 |
| 2010/0104261 | A1 | 4/2010 | Liu et al. |
| 2011/0150275 | A1* | 6/2011 | Tong .................... G06T 3/0068 382/103 |
| 2012/0293686 | A1 | 11/2012 | Karn et al. |
| 2012/0307155 | A1* | 12/2012 | Gleicher ............... G06T 3/0093 348/581 |
| 2013/0179112 | A1* | 7/2013 | Ma ....................... G01C 22/006 702/141 |
| 2014/0023348 | A1 | 1/2014 | O'Kelly et al. |
| 2014/0079297 | A1 | 3/2014 | Tadayon et al. |
| 2015/0094622 | A1* | 4/2015 | Curtiss ................. A61B 5/6898 600/595 |

FOREIGN PATENT DOCUMENTS

| | | |
|---|---|---|
| CN | 101853286 A | 10/2010 |
| CN | 102110293 A | 6/2011 |
| CN | 102263907 A | 11/2011 |
| CN | 102906746 A | 1/2013 |
| CN | 102939630 A | 2/2013 |
| EP | 2112619 A1 | 10/2009 |
| EP | 2180698 | 4/2010 |
| JP | 2005318548 A | 11/2005 |
| JP | 2007519053 A | 7/2007 |
| JP | 2010062621 A | 3/2010 |
| JP | 2010103878 A | 5/2010 |
| JP | 2010109592 A | 5/2010 |
| JP | 2011040860 A | 2/2011 |
| RU | 2339091 C2 | 11/2008 |
| WO | 2013030634 A1 | 3/2013 |
| WO | 2013186958 A1 | 12/2013 |

OTHER PUBLICATIONS

Bernier, et al., "Face Detection for Video Summaries", Proceedings of International Conference on Image and Video Retrieval, Jul. 2002, 8 pages.
Guironnet, et al., "Video summarization based on camera motion", Journal on Image and Video Processing, Apr. 2007, 25 pages.
"Homography", Wikipedia, May 5, 2014, 10 pages.
Ma, et al., "A User Attention Model for Video Summarization", Proceedings of the tenth ACM International Conference on Multimedia, Dec. 2002, 10 pages.
"Motion compensation", Wikipedia, May 5, 2014, 7 pages.
The PCT Written Opinion dated May 17, 2016 for PCT application No. PCT/US2015/034992, a foreign counter part to U.S. Appl. No. 14/303,466, 4 pages.
PCT Search Report dated Sep. 23, 2015 for PCT Application No. PCT/US2015/034992, 10 pages.
Stasiak, et al., "Face Tracking and Recognition in Low Quality Video Sequences With the Use of Particle Filtering", In Proceedings of the 43rd Annual International Carnahan Conference on Security Technology, Oct. 2009, pp. 126-133.
"Summon to Attend Oral Proceedings Issued in European Patent Application No. 15731785.0", dated Jul. 16, 2019, 10 Pages.
"Office Action and Search Report Issued in Chinese Patent Application No. 201580031441.0", dated Jan. 23, 2019, 14 Pages.
"Office Action Issued in Russian Patent Application No. 2016148407", dated Jan. 22, 2019, 11 Pages.
"Office Action Issued in Japanese Patent Application No. 2016-572515", dated May 28, 2019, 9 Pages.
"Office Action Issued in Mexican Patent Application No. MX/a/2016/016293", dated Dec. 13, 2018, 7 Pages.
"Office Action Issued in Japanese Patent Application No. 2016-572515", dated Nov. 26, 2019, 9 Pages.

\* cited by examiner

RULE-BASED VIDEO IMPORTANCE ANALYSIS

BACKGROUND

Consumers frequently capture videos using their smart phones and personal video recorders. However, only a small percentage of these consumers edit and share their videos with other people. Further, a consumer may find the editing of such videos to be a tedious process, as the videos are generally taken in a casual manner without much planning, and may contain only a few interesting moments. As more videos are generated by a consumer over time, the consumer may also have difficulty remembering the content of the videos. While most video playback devices may provide thumbnail image representations of the videos, such thumbnail image representations may not provide sufficient clues to the content of the videos.

SUMMARY

Described herein are techniques for performing rule-based analysis of a video file to rank sections of the video file based on their importance. The techniques may also include performing rule-based analysis of a collection of video files to rank multiple video files based on their importance. The importance of a video file or a video section may correlate with the amount of interest that the video file or the video section is expected to generate in a viewer. In various embodiments, the rule-based analysis may evaluate the importance of a video file or a video section based on the subjective importance and/or the objective technical quality of the video frames in the video file or the video section.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
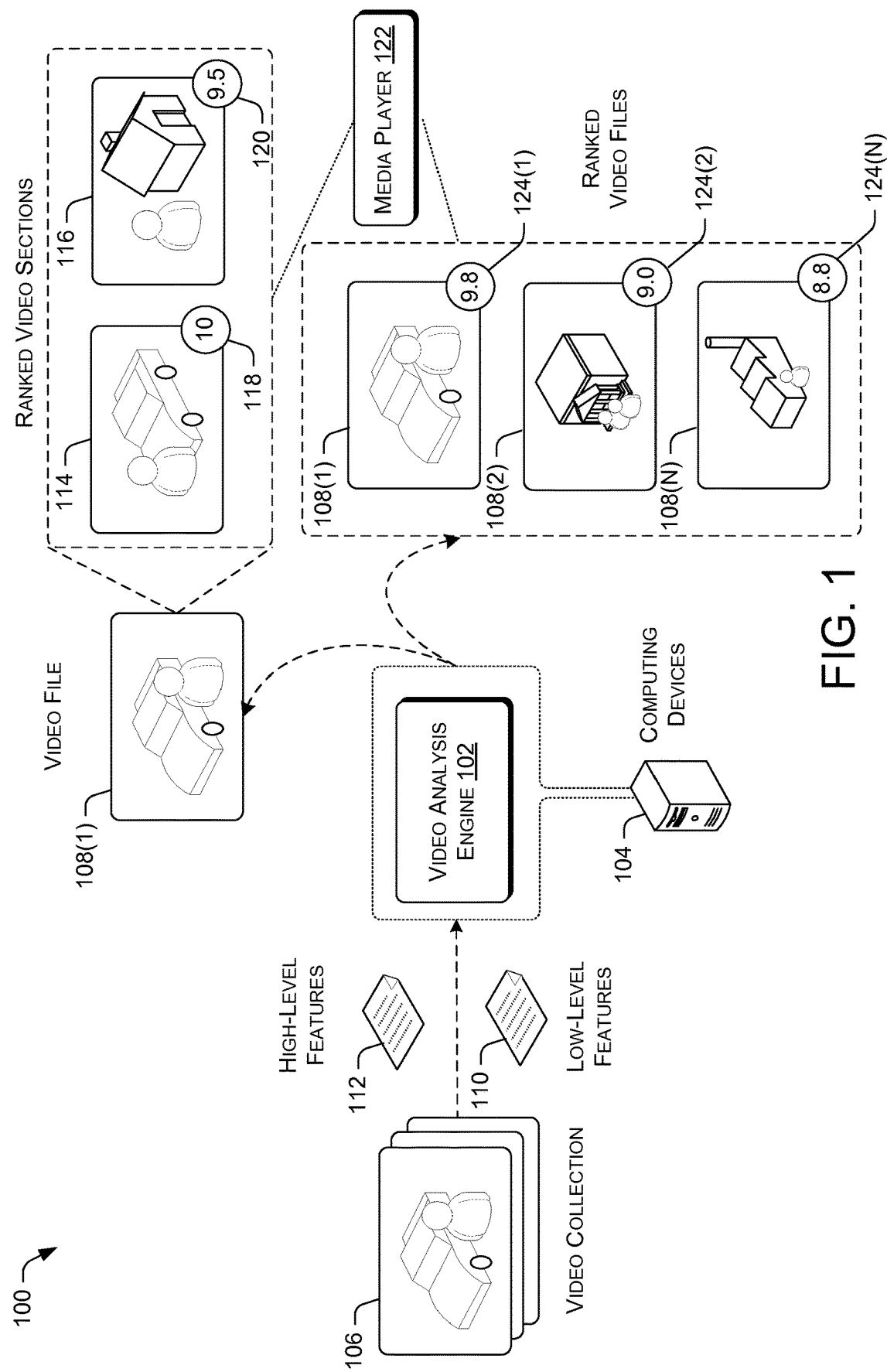
FIG. 1 is a block diagram that illustrates an example scheme for using a rule-based video analysis engine to rank video sections of a video file or video files in a collection of video files based on their importance.

Described herein are techniques for performing rule-based analysis of a video file to rank sections of the video file based on their importance. The techniques may also include performing rule-based analysis of a collection of video files to rank the video files based on their importance. The importance of a video file or a video section may correlate with the amount of interest that the video file or the video section is expected to generate in a viewer. In various embodiments, the rule-based analysis may evaluate the importance of a video file or a video section based on the subjective importance and/or the objective technical quality of the video frames in the video file or the video section. An example of subjective importance may be that a viewer will consider a video frame depicting a face of a person that is known to the viewer as more important than a video frame that depicts the face of a person that the viewer does not know. An example of objective technical quality may be the exposure quality of the video frame.

The rule-based analysis comprises analyzing the audio content and the video content of the video files for multiple low-level features and high-level features on a frame-by-frame basis. For example, low-level features may include features such as exposure quality, saturation quality, shakiness of video frames, average brightness, color entropy, and/or histogram differences between adjacent video frames. High-level features may include features such as the quantities, positions, and/or facial features of human faces that are detected in the video frames. The analysis may include the application of local rules and global rules. The local rules may be applied during the generation of feature analysis results for a video frame, and the global rules may be applied to during the generation of feature analysis results for an entire video file.

The rules may provide and combine the results from the feature analysis to generate importance scores. Importance scores may be generated for frames of video files, sections of videos, and/or video files in their entireties. These importance scores may be used to rank sections of video files and/or video files. The importance scores may be used to facilitate viewing, editing, and sharing of video files. For example, a consumer may select a set of video files with the highest importance scores for sharing on a website. In another example, an application may stitch together sections of a video file with the highest importance scores to create a highlight video file.

In some instances, a video file may be segmented into video sections with varying degrees of importance based on the amount of detected camera motion. The camera motion may be detected via the movement of feature points that are detected in the video frames in the video file. In some instances, the importance of a video section may correlate with the amount of interest that the video section is expected to elicit from viewers.

The use of the techniques described herein may enable a user to rank video files based on their importance to the user. Based on such ranking, the user may decide which video files to keep and which video files to delete. In some instances, the user may also use the rankings of the video files to determine whether to post specific video files on an online sharing website. The techniques described herein may also present thumbnail image representations that represent importance sections of a video file, such that the user may tell at a glance the interesting portions of a video file. Such information may assist the user in editing the video file to improve content quality or highlight particular sections of the video file. Examples of techniques for performing rule-based analysis of video files in accordance with various embodiments are described below with reference to FIGS. 1-7.

Example Scheme

FIG. 1 is a block diagram that illustrates an example scheme 100 for using a rule-based video analysis engine to rank video sections of a video file or video files in a collection of video files based on importance. The example scheme 100 may include a video analysis engine 102. The video analysis engine 102 may be executed on one or more computing devices 104. The one or more computing devices 104 may include general purpose computers, such as desktop computers, tablet computers, laptop computers, servers, and so forth. However, in other embodiments, the computing devices 104 may include smart phones, game consoles, or any other electronic devices. The multiple computing devices 104 may include various processors, such as central processor units (CPUs), graphics processor units (GPUs), other types of processors, or a combination of any of the above.

The video analysis engine 102 may perform rule-based analysis of a video collection 106. The video collection 106 may include multiple video files, such as the video files 108(1)-108(N). The rule-based analysis may comprise analyzing the audio content and the video content of the video files 108(1)-108(N) for multiple low-level features 110 and multiple high-level features 112 on a frame-by-frame basis. For example, the multiple low-level features 110 may include features such as exposure quality, saturation quality, and shakiness of video frames. The multiple high-level features 112 may include features such as the quantities, positions, and facial features of human faces that are detected in the video frames.

By performing the rule-based analysis, the video analysis engine 102 may generate importance scores for sections of a video file, such as the video 108(1), and importance scores for video files, such as video files 108(1)-108(N) of the video collection 106. Accordingly, the video analysis engine 102 may rank sections of a video according to their importance scores. For example, the video file 108(1) may include a video section 114 and a video section 116 that are ranked according to their importance scores, such as the importance scores 118 and 120, respectively. Once the video sections are ranked, the video analysis engine 102 may display thumbnail image representations of the video sections, in which a selection of a thumbnail image representation may cause a media player 122 to play the corresponding video section.

The video analysis engine 102 may also rank the video files in the video collection 106 according to their importance scores. For example, the video files 108(1)-108(N) of the video collection 106 may be ranked according to their importance scores 124(1)-124(N). Once the video files are ranked, the video analysis engine 102 may display thumbnail image representations of the video files, in which a selection of a thumbnail image representation may cause the media player 122 to play the corresponding video file or a section of the corresponding video file.

Example Components

Figure 2:
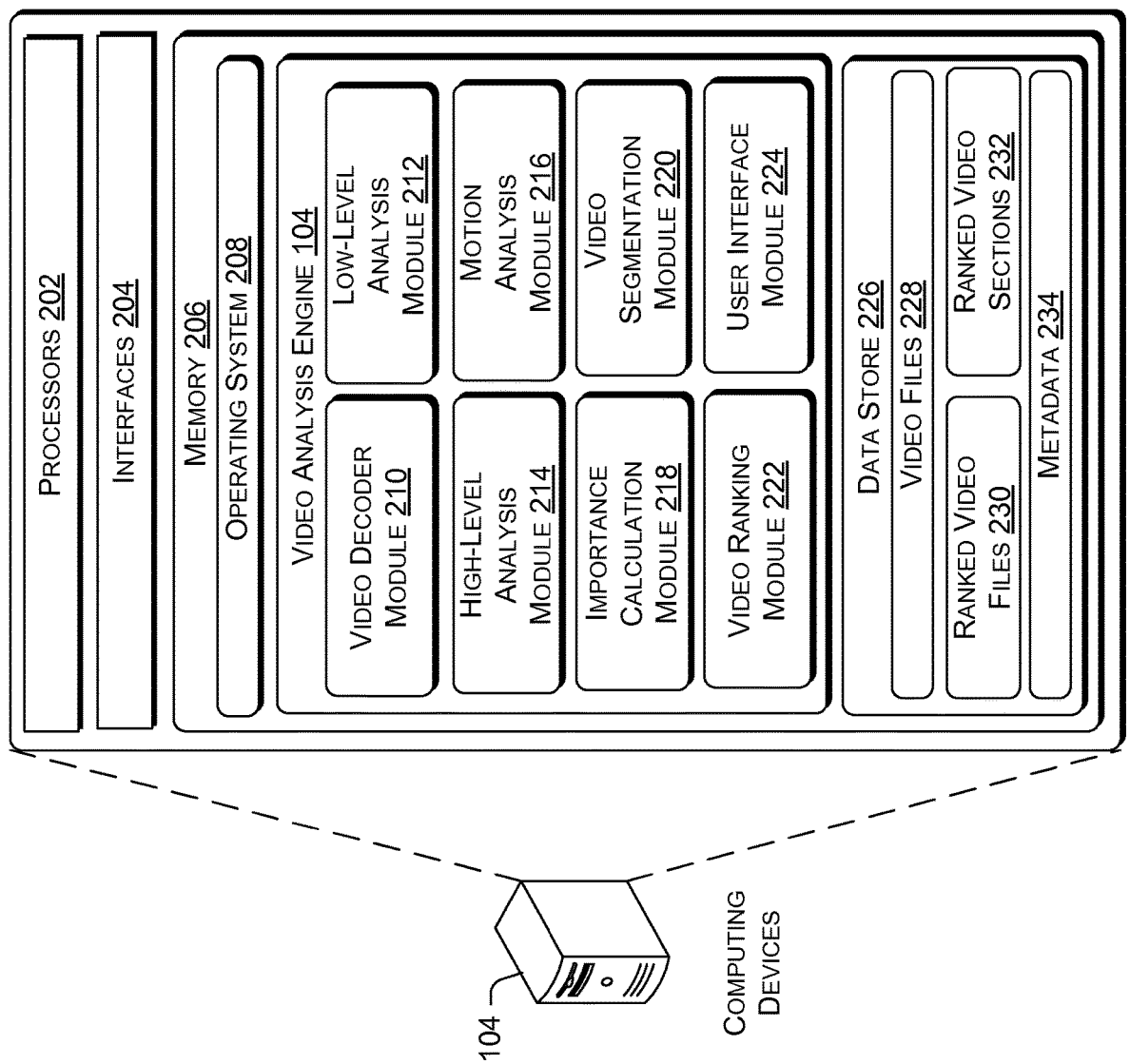
FIG. 2 is an illustrative diagram that shows example components of a rule-based video analysis engine for ranking video sections of a video file or video files in a collection of video files based on their importance.

FIG. 2 is an illustrative diagram that shows example components of a rule-based video analysis engine 102 for ranking video sections of a video file or video files in a collection of video files based on their importance. The video analysis engine 102 may be implemented by the one or more computing devices 104. The computing devices 104 may include one or more processors 202, interfaces 204, and memory 206. Each of the processors 202 may be a single-core processor or a multi-core processor. The interfaces 204 may include user interfaces and network interfaces. The user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices or other electronic/software selection methods.

The network interface may include wired and/or wireless communication interface components that enable the computing devices 104 to transmit and receive data via a network. In various embodiments, the wireless interface component may include, but is not limited to cellular, Wi-Fi, Ultra-wideband (UWB), personal area networks (e.g., Bluetooth), satellite transmissions, and/or so forth. The wired interface component may include a direct I/O interface, such as an Ethernet interface, a serial interface, a Universal Serial Bus (USB) interface, and/or so forth. As such, the computing devices 104 may have network capabilities. For example, the computing devices 104 may exchange data with other electronic devices (e.g., laptops computers, desktop computers, mobile phones servers, etc.) via one or more networks, such as the Internet, mobile networks, wide area networks, local area networks, and so forth.

The memory 206 may be implemented using computer-readable media, such as computer storage media. Computer-readable media includes, at least, two types of computer-readable media, namely computer storage media and communication media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that may be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The memory 206 of the computing devices 104 may store an operating system 208 and modules that implement the video analysis engine 102. The operating system 208 may include components that enable the computing devices 104 to receive data via various inputs (e.g., user controls, network interfaces, and/or memory devices), and process the data using the processors 202 to generate output. The operating system 208 may further include one or more components that present the output (e.g., display an image on an electronic display, store data in memory, transmit data to another electronic device, etc.). The operating system 208 may enable a user to interact with modules of the video analysis engine 102 using the interface 204. Additionally, the operating system 208 may include other components that perform various other functions generally associated with an operating system.

The modules may include a video decoder module 210, a low-level analysis module 212, a high-level analysis module 214, a motion analysis module 216, an importance calculation module 218, a video segmentation module 220, a video ranking module 222, and a user interface module 224. Each of the modules may include routines, programs instructions, objects, and/or data structures that perform particular tasks or implement particular abstract data types. Additionally, a data store 226 may reside in the memory 206. Each of the low-level analysis module 212 and the high-level analysis module 214 may apply local rules or global rules to analyze the importance of feature data, i.e., video data and/or audio data, in video files. A local rule may affect the assignment of importance for a single video frame based on the feature data in the single video frame. Conversely, a global rule may affect the assignment of importance for an entire video file based on the feature data in the multiple video frames of the video file, or affect the assignment of importance for each of a set of video frames in the video file based on the features that are shared across the set of video frames.

The video decoder module 210 may decode a video file, such as the video file 108(1), to obtain video frames and/or audio data associated with each of the video frames. The video decoder module 210 may use various codecs to decode video files, such as H.264, MPEG-2, MPEG-4, etc.

The low-level analysis module 212 may analyze each decoded video frame for low-level features to produce feature scores. In various embodiments, the low-level features may include exposure quality, saturation quality, hue variety, shakiness, average brightness, color entropy, and/or histogram differences between adjacent video frames. The low-level analysis module 212 may use algorithms to derive histograms that show the exposure, saturation, and hue of video frames. In the analysis of exposure quality, the low-level analysis module 212 may analyze an exposure histogram of the exposure balance of a video frame. The low-level analysis module 212 may assign an exposure rating score to the video frame based on the exposure balance according to a local rule, in which higher exposure balance may result in a higher exposure rating score. Conversely, a lower exposure balance of the video frame may result in a lower exposure rating score.

In the analysis of saturation quality, the low-level analysis module 212 may analyze the saturation histogram of a video frame, such as a saturation histogram for a HSV color space. Based on the analysis, the low-level analysis module 212 may compute a saturation score that reflects an amount of saturation in a middle set of values in the saturation histogram according to a local rule. As such, more saturation in this middle range results in a higher saturation score for the video frame. Conversely, less saturation in this middle range results in a lower saturation score for the video frame.

In the analysis of hue variety, the low-level analysis module 212 may assess the balance of a hue histogram for a video frame. The low-level analysis module 212 may further assign hue scores based on a local rule. Accordingly, the low-level analysis module 212 may assign a higher hue score when the hues of a video frame is well balanced, i.e., shows a more variety of colors. Conversely, the low-level analysis module may assign a lower hue score when the hues of the video frame is less balanced, i.e., shows less variety of colors.

In the analysis of shakiness, the low-level analysis module 212 may use a motion analysis module 216 to track the movement of feature points between frames and generate a transform that models that movement. Feature points are interest points in a video frame that can be reliably located across multiple video frames. A feature point is distinctive in that it contains 2-dimensional (2D) structure, and may be localized in the x and y directions. The low-level analysis module 212 may use the transform to analyze local and global trends related to the magnitude and direction of the feature point motion. The local and global trends may quantify shakiness in a video file as an attribute of local per-frame change. The shakiness of a video file may be determined by the motion analysis module 216 as described below with respect to motion categorization analysis. Accordingly, the low-level analysis module 212 may apply a global rule that assigns a shakiness score to the video file that is inversely proportional to the amount of shakiness in the video file, such that greater shakiness results in a lower shakiness score, and vice versa.

In the analysis of average brightness, the low-level analysis module 212 may calculate an average of the luminance components of all the pixels in a video frame. In various embodiments, the low-level analysis module 212 may average the pixel values in a gray-scale image representation of the video frame. For example, the pixel values may range from 0-255, in which 0 corresponds to the color black and 255 corresponds to the color white. In some embodiments, the low-level analysis module 212 may be further optimized to read the pixel value from every nth pixel. In other words, the low-level analysis module 212 may skip a predetermined number of pixels in the x direction and/or the y direction while performing the analysis. Based on the average of the pixel values of the pixels in a video frame, the low-level analysis module 212 may determine the brightness of the video frame. Accordingly, the low-level analysis module 212 may apply a local rule to assign a brightness score that is proportional to the average pixel value of the video frame when the average pixel value of the video frame falls with a predetermined mid-range of brightness. However, the low-level analysis module 212 may assign a brightness score that is lower than any brightness score that is assigned to an average pixel value that falls within the predetermined mid-range of brightness when the average pixel value falls outside, i.e., is higher or lower than the predetermined mid-range of brightness. Such a brightness score may diminish as the average pixel value decreases while being lower than the lower bound of the predetermined mid-range of brightness. Such a brightness score may also diminish as the average pixel value increases while being higher than the upper bound of the predetermined mid-range of brightness.

In the analysis of color entropy, the low-level analysis module 212 may determine the amount of color entropy in a video frame. The amount of color entropy is an indicator of the differences between the colors in the video frame. The color-entropy value assigned by the low-level analysis module 212 may range from "0" to "1", depending on the actual amount of color entropy in the video frame. For example, the low-level analysis module 212 may assign a color-entropy value of "1" to the video frame when the pixels of the video frame have the greatest amount of difference. The low-level analysis module 212 may assign a color-entropy value of "0" to the video frame when the pixels of the video frame have the least amount of difference. In various embodiments, the low-level analysis module 212 may determine the color-entropy value by calculating a color domain histogram for a color space (e.g., the RGB color space or the HSV color space).

In such embodiments, the low-level analysis module 212 may initially create a histogram that captures multiple color dimensions. For example, in the RGB color space, each of R, G, and B may have 256 possible values, in which case the histogram may have 256×256×256 buckets. In at least one embodiment, the buckets may be further quantized for optimizing bucket size and/or processing speed, e.g., the size may be 25×25×25, such that multiple color values will fall in the same bucket. Thus, in one example, the histogram may be expressed in the following format in code: int Histogram [256*256*256], which means that the histogram array has an element for all possible colors in the RGB color space. Accordingly, when the low-level analysis module 212 reads a pixel, the low-level analysis module 212 may set a value as follows:

int IndexInHistogramForColor=
    pixelColor.red+(256*pixelColor.green)+(256*256*pixelColor.blue);
    Histogram[IndexInHistogramForColor]=
    Histogram[IndexInHistogramForColor]+1; // when one more
    pixel with this color is observed, increment its count Once the above steps are performed for each pixel in the video frame, the low-level analysis module 212 may normalize the histogram. In other words, the low-level analysis module 212 may divide each value with a size of the histogram, such that the values in the histogram are between 0 and 1 and the values add up to 1. As a result, an element with the highest value occurs the most frequently in the video frame.

Entropy for the pixel values in the histogram may be formulated as the sum of all (Histogram[n]*log(Histogram[n])), as follows:

$$H(X) = \sum_i P(x_i)I(x_i) = -\sum_i P(x_i)\log_b P(x_i)$$

The low-level analysis module 212 may determine a relative color entropy (i.e., the color entropy of the video frame with respect to other video frames) by dividing the entropy from the histogram by the maximum possible entropy. The maximum possible entropy may be defined as when all Histogram[n] have the same value, that is, equal to (1.0/number of possible values). Once the relative color entropy value for a video frame is obtained, the low-level analysis module 212 may apply a local rule to obtain an entropy score for the video frame from the relative color entropy of the video frame. In various embodiments, the entropy score of the video frame may be directly proportional to the relative entropy value of the video frame, e.g., higher relative entropy value results in higher entropy score, and vice versa.

In the analysis of histogram difference, the low-level analysis module 212 may determine the histogram difference between two adjacent video frames. In various embodiments, the low-level analysis module 212 may divide each video frame into multiple cells, (e.g., 10×10 cells). For each cell of the video frame t and the adjacent video frame t+1, the low-level analysis module 212 may calculate a color histogram (e.g., a RGB histogram). Subsequently, for each cell in the video frame t, the low-level analysis module 212 may compute a difference between its histogram and the histogram of a cell having a corresponding position in the adjacent video frame t+1. The differences between the histograms of cell pairs in the two adjacent video frames may be further standardized (e.g., squared, normalized, and/or averaged, etc.) to obtain a final histogram difference value for the two adjacent frames, in which the value may ranges between "0" and "1". Once the histogram difference value for the two adjacent video frames is obtained, the low-level analysis module 212 may apply a local rule to obtain a histogram difference score for the video frame t from the histogram difference value. In various embodiments, the histogram difference score of the video frame may be directly proportional to the histogram difference, e.g., higher histogram difference value results in higher histogram difference score, and vice versa.

In at least some embodiments, the low-level analysis module 212 may optimize some of the analyses to speed up the processing of a video file. For example, the low-level analysis module 212 may perform the analyses (e.g., exposure rating analysis, hue variety analysis, etc.) for a subset of the video frame in a video file rather than all the video frames in the video file. The low-level analysis module 212 may also perform one or more of the analyses on a scaled down version of an original frame to gain some efficiency. For example, the hue variety analysis and the saturation analysis for a video frame may be performed on a down sampled version of the video frame. In another example, the exposure quality analysis may be performed on a monochrome and down sampled version of the video frame. The low-level analysis module 212 may also perform multiple analyses in parallel or substantially in parallel. For example, the saturation quality analysis and the hue variety analysis may be performed in parallel.

The high-level analysis module 214 may analyze each decoded video frame for high-level features. In at least one embodiment, the high-level feature analyses may include face detection, face tracking, face recognition, saliency analysis, audio power analysis, audio classification analysis, speech analysis, and motion analysis.

In face detection, the high-level analysis module 214 may analyze a decoded video frame to detect whether human faces are presented in the video frame. A detected face may be facing a camera that captured the video frame or sideways with respect to the camera. Based on this detection, the high-level analysis module 214 may generate a list of detected faces with their positions in the video frame, the area of the video frame covered by each face, and a detection confidence score for each face that indicate a confidence in the detection.

In various embodiments, the high-level analysis module 214 may apply a local rule to calculate a face importance score for the video frame based on a size of a detected face as a percentage of a size of the video frame. Faces with the same size as detected on two video frames may be assigned the same face importance score. However, if a face on a video frame $t_2$ is larger than a face on a video frame $t_1$, then the face importance score for the video frame $t_2$ will be higher, because larger faces are considered more important than smaller faces. In other embodiments, the high-level analysis module 214 may be configured to calculate a face importance score if the size of the detect face is between a minimum size threshold and a maximum size threshold. Conversely, faces whose size are smaller than the minimum size threshold or greater than a maximum size threshold may be considered invalid for face importance score calculation by the high-level analysis module 214, or a negative score bias may be assigned to the corresponding video frame for such occurrences.

Alternatively or concurrently, the local rule for calculating the face importance for the video frame may take into consideration the facial features of each face depicted in the video frame. For example, facial features may include whether the face is smiling or not, or whether the eyes are open or not, etc. Thus, a positive score bias may be assigned to the corresponding video frame for a face that is smiling, while a negative score bias may be assigned when the face is not smiling. Likewise, a positive score bias may be assigned to the corresponding video frame for a face with open eyes, while a negative score bias may be assigned when the eyes are closed.

In face recognition, the high-level analysis module 214 may use a facial recognition algorithm to match each human face that is detected in a video frame to a known identity of a person. In some embodiments, the high-level analysis module 214 may use a knowledge database of known faces to match a human face to a known person. Alternatively or concurrently, the high-level analysis module 214 may use the user interface module 224 to provide user interface controls that enable a user to tag each of the one or more recognized faces with an identity, an importance rating of the face, and/or a relationship of the person with the face to the viewer. In at least one embodiment, the information provided by the viewer with respect to the faces may be added to the knowledge database.

In face tracking, the high-level analysis module 214 may track the human faces across multiple video frames. In this way, the high-level analysis module 214 may ascertain a set of faces that are present in a video file, as well as track the frequency that each face appears in the video file. Furthermore, in face grouping, the high-level analysis module 214 may group faces that are tracked to determine whether faces that are detected on different video frames belong to the same person. In various embodiments, the high-level analysis module 214 may obtain a set of facial features for each of the detected faces in the video frames. The high-level analysis module 214 may compare the sets of facial features for the detected faces in order to group the detected faces into groups according to facial feature similarity. The high-level analysis module 214 may evaluate the importance of each group of faces according to the numbers of faces in each group. The number of faces in each group is directly proportional to the prevalence of the face in the video file. Further, a higher prevalence may indicate a higher importance of the person with the face, and vice versa. Accordingly, a group importance score for a group of faces may a summation of the face importance scores of the faces in the group. As such, the highest-level analysis module 214 may sum the face importance scores of the faces in a group, as depicted in multiple video frames, to calculate a group importance score for the group.

For example, the person whose face appears in the group with the highest group importance score may be considered a main character. Based on such information, the high-level analysis module 214 may apply a global rule to the video frames, such that the face importance scores of the video frames that show the main character may be further positively biased, i.e., elevated. The positions of faces that are included in a group as captured in multiple video frames may also lower the face importance scores assigned to video frames. For example, the importance score of a video frame showing a face of a particular person may be biased according to a distance of the face to the center of the video frame along an axis (e.g., x-axis or y-axis), such that a face that is closer to the center results in a higher importance for the video frame, and vice versa.

In frame saliency analysis, the high-level analysis module 214 may detect the salient parts of a video frame. For example, a salient part of a video frame may capture an object that is in motion. Based on the saliency analysis, the high-level analysis module 214 may apply a local rule to generate a heat map that displays a saliency score of every pixel in the video frame. A heat map is a graphical representation of data that is arranged in a matrix in which individual values in the matrix are represented using colors. The high-level analysis module 214 may further generate a frame saliency score for the video frame that is based on the saliency scores of the pixels in the video frame. For example, the video frame saliency score for the video frame may be an average of the pixel saliency scores.

In audio power analysis, the high-level analysis module 214 may assess the audio data that corresponds in time duration to a video frame (e.g., ⅓₀th or ⅙₀th of a second) and calculate a root mean square (RMS) value of the audio power. A higher RMS value of the audio power may indicate a higher importance of the corresponding video frame, and vice versa. Thus, the high-level analysis module 214 may assign an audio power importance score to the corresponding video frame according to a local rule.

In audio classification analysis, the high-level analysis module 214 may use a machine learning classifier to determine whether the audio data that corresponds in time duration to a video frame contains different types of audio data (e.g., noise, speech, or music). Different types of audio data may reflect different importance of the corresponding video frame. Based on a local rule, the high-level analysis module 214 may assign an audio classification importance score to the corresponding video frame based on the type of audio data. For example, the presence of speech may cause the high-level analysis module 214 to assign a high audio classification importance to a corresponding video frame. In contrast, the presence of music may cause the assignment of a medium audio classification score to the corresponding video frame. Furthermore, the presence of noise may cause the high-level analysis module 214 to assign a low audio classification score to the corresponding video frame.

In motion categorization analysis, the high-level analysis module 214 may use the motion analysis module 216 to track the movement of feature points between video frames and generate a transform that models that movement. The high-level analysis module 214 may use the transform to analyze local and global trends related to the magnitude and direction of the movement. In turn, the high-level analysis module 214 may use the local and global trends to account for shakiness captured in the video frames and determine intentional movement of a camera with respect to a scene, such as zooming, panning, etc.

In various embodiments, the motion analysis module 216 may initiate the motion categorization analysis by locating feature points for two adjacent frames. A feature point may be a point in an image that remains identifiable even with a 2-dimensional (2D) or 3D transforms of the image. To detect the feature points, the motion analysis module 216 may down sample the image and create a pyramid of down sampled images of smaller dimensions. The down sampled images are then compared by the motion analysis module 216 to determine common points (i.e., feature points) among the down sampled images. In various embodiments, the motion analysis module 216 may use one or more of several detection algorithms to detect the common points, such as a Laplace detection algorithm, a Harris detection algorithm, a Hessian detection algorithm, a HessianLaplace detection algorithm, a HessianAffine detection algorithm, an EdgeFoci detection algorithm, etc.

Once the feature points are identified for two adjacent frames, the motion analysis module 216 may determine a transform that aligns the two adjacent frames such that a maximum number of feature points match. The transform may be performed using geometric matching that is an implementation of robust parameter estimation. The transform may provide a homography transform matrix that is calculated from the matched feature points. In various embodiments, the motion analysis module 216 may use a Random Sampling and Consensus (RANSAC) algorithm to obtain initial parameter estimates and a list of statistical inliers, in which the initial parameter estimates are further refined. The various camera motions in video frames that are aligned by the homography transform are illustrated in FIG. 3.

Figure 3:
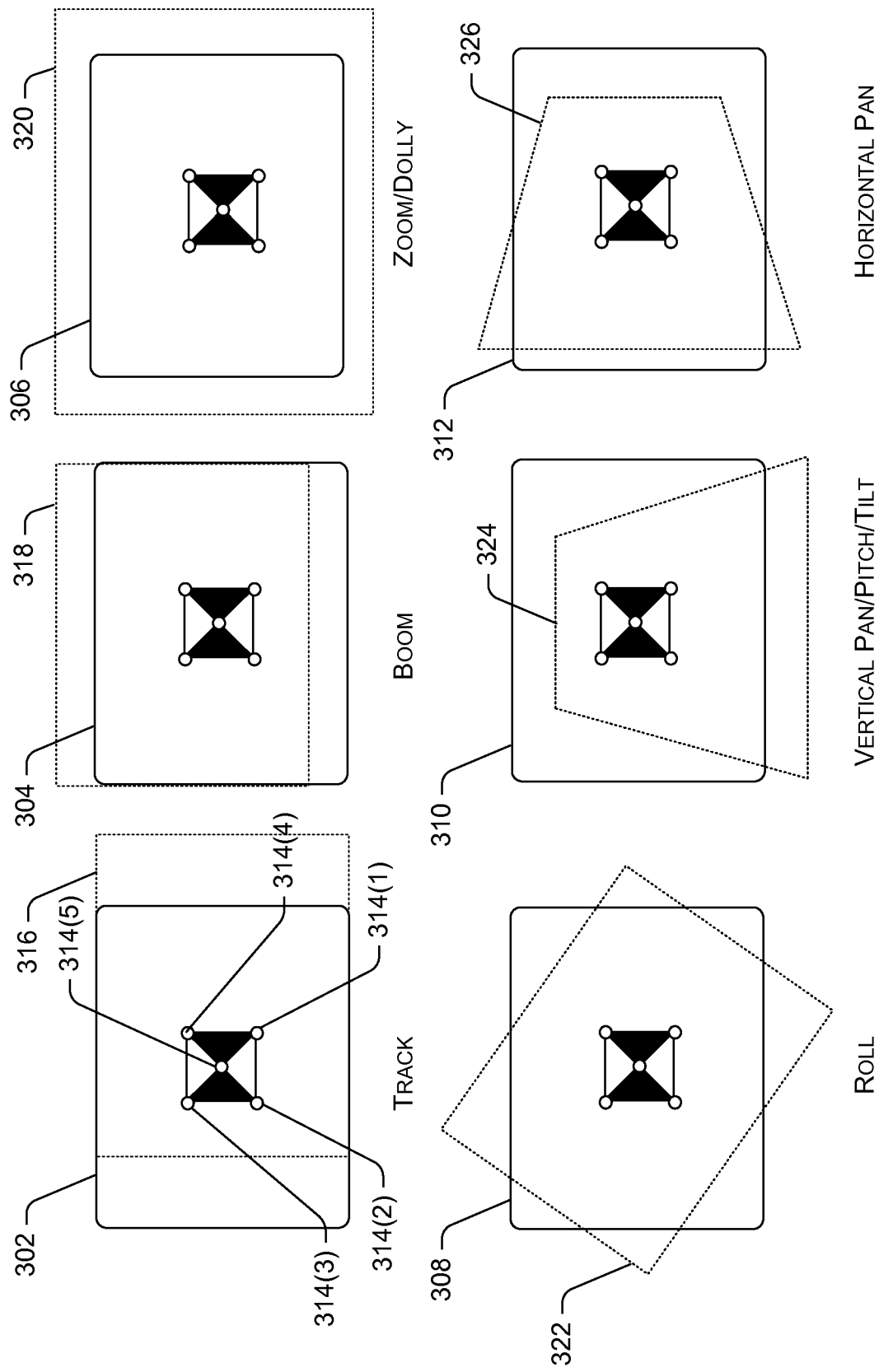
FIG. 3 is an illustrative diagram that shows the use of a homograph transform to align example feature points in multiple video frames.

FIG. 3 is an illustrative diagram that shows the use of a homograph transform to align an example feature points in multiple video frames. As shown, each of the video frames 302-312 may respectively include a group of identified feature points that are depicted by circles. For example, the group of feature points in the video frame 302 is depicted by the circles 314(1)-315(5). Each feature point in a group of feature points may retain their relative positions to each other across multiple video frames, despite movement of the camera that captured the multiple video frames. For example, the transformed video frame 316 may be a subsequent video frame to the video frame 302 that is a result of a tracking movement of a camera. The transformed video frame 318 may be a subsequent video frame to the video frame 304 that is a result of a boom movement of the camera. The transformed video frame 320 may be a subsequent video frame to the video frame 306 that is a result of a zoom/dolly movement of the camera. The transformed video frame 312 may be a subsequent video frame to the video frame 308 that is a result of a roll movement of the camera. The transformed video frame 314 may be a subsequent video frame to the video frame 310 that is a result of a vertical pan/pitch/tilt of the camera. The transformed video frame 316 may be a subsequent video frame to the video frame 312 that is a result of a horizontal panning of the camera.

However, regardless of the movement by the camera that produced the transformed video frames 326-336 from the video frames 302-312, the motion analysis module 216 may use the homograph transform to align the feature point in a video frame and its corresponding transformed video frame.

Returning to FIG. 2, the RANSAC algorithm may directly compute transformation matrix parameters from a minimum subset of the feature point matches. For example, a similarity transform (e.g., translation, rotation or scale) may be computed from two feature points that are in correspondence between two frames. Once a candidate geometric transformation has been obtained, the RANSAC algorithm may validate the transformation by testing the transformation on all the other feature point matches in the data set, and generating a count of the number of inliers which are feature points that project spatially with sufficient accuracy. In other words, the RANSAC algorithm may initially randomly pick a minimal set of point matches, compute the transformation parameters from this set, and then validate these parameters by counting the number of inlier matches. Subsequently, the RANSAC algorithm records the best transformation. The RANSAC algorithm may repeat this procedure a number of times until the probability of finding a good set of transformation parameters reaches a predetermined probability threshold given the data mismatch rate.

In some embodiments, the RANSAC algorithm may be modified to make better use of Bayesian statistics. Rather than counting inliers during the validation of the transformation parameters, the RANSAC algorithm may compute a log probability score for each random transformation from all the feature point matches. This score may include two parts: (1) a prior probability score which depends on the parameters and how far away the parameters are from commonly expected values, and (2) a probability score based on a robust function of the re-projection distance of the feature point matches. Such a score favors feature points which project to the correct locations, but allows outliers to coexist.

From the homograph transform, the motion analysis module 216 may extract the magnitudes and direction of the zooming and vertical translation components, while ignoring other kinds of motions. These magnitudes and directions are intentional movement of a camera as recorded in the two adjacent frames. In other words, these magnitudes and directions are first order derivative of the actual movement change from a first frame to a second adjacent frame. The motion analysis module 216 may determine shakiness movement of the camera that recorded the video frames by calculating motion data running average of the movement vectors of the video frames, and subtract the intentional movement of the camera from the motion data running average. The calculation of the motion data running average suppresses local variance and preserve long term trends that represent the intentional movement. In other words, the difference between the intentional movement and the overall movement change from first frame to the second frame is the shakiness movement of the camera that recorded the two frames.

The magnitude of zooming and vertical translation values that are recorded in a set of frames may provide a clue regarding the importance of those frames. For example, a higher value may indicate acceleration in the camera motion with respect to one or more objects in a video frame. Further, a region of a video frame with higher acceleration may be assumed to be more important, because the camera may have made a quick change in motion to capture some action. Accordingly, the high-level analysis module 214 may assign a motion importance score to each frame based on an amount of motion acceleration.

The motion analysis module 216 may analyze the intentional movement data to determine the local maxima and minima pivoted around zero crossings for both the zoom and vertical translation motions. In some embodiments, the motion analysis module 216 may use the local maxima and minima locations to segment the data into video sections. Alternatively or concurrently, the motion analysis module 216 may use the local maxima and minima locations to segment the video file into video sections that have paired directions of change, such as zoom-in paired with zoom-out, pan-up paired with pan-down, etc.

The segmented video sections of a video file may be consistent with changes in scenes of the video file. Accordingly, the section boundaries in the video file may be used as guidelines to divide the video file into video sections of different importance. The boundaries may align the start and end of important/unimportant sections with the points in time in which there is a shift in the movement of the camera or a change in the nature of the activity in the scene. Furthermore, the motion analysis module 216 may combine and average the magnitudes for zoom and pan motion for a section. The amount acceleration represented by the average of the magnitudes of zoom and pan motion for a video section may be used by the motion analysis module 216 to assign a motion importance score to the video section in the same manner as described above with respect to frames.

In at least some embodiments, the high-level analysis module 214 may optimize some of the analyses to speed up the processing of a video file. For example, the high-level analysis module 214 may perform the face detection, the face tracking, and/or the face recognition for one or more faces in each video frame using a monochrome and down sampled version of the video frame. The high-level analysis module 214 may also perform multiple analyses in parallel or substantially in parallel. For example, the face tracking and the face recognition may be performed in parallel.

The importance calculation module 218 may normalize the various feature scores that are generated for the video frames of a video file and calculate a video importance value for the video file. For example, the importance calculation module 218 may average a set of normalized feature scores (e.g., face importance score, motion importance score, exposure rating score, saturation score, etc.) for each video frame to obtain a frame importance score for each video frame. The video frame importance scores may be further averaged to derive the video importance value for the video file. In some embodiments, the calculation of the video importance value for the video file may also include the biasing of one or more feature scores that are associated with video frames. For example, the importance calculation module 218 may be configured to apply a positive bias so that the presence of a face in a video frame affects a frame importance score of that frame by a higher degree than the hue-variety score of the video frame.

In another example, the importance calculation module 218 may generate a video importance value for a video file as follows:

$$\text{frame\_score} = w_1 * \text{Face Importance} + w_2 * F_2 + w_3 * F_3 + \ldots w_n * F_n \quad (1)$$

$$\text{video\_score} = \frac{\Sigma(\text{frame\_score})}{\text{number of frames}} \quad (2)$$

in which $w_i$ are weights and $F_i$ are features. The weights may dictate the importance of features. For example, if a viewer prefers video that are that are bright, and $F_2$ is the feature that correlates to this property, then the importance calculation module 218 may be configured to assign a higher value to $w_2$ than the weights for other features. This bias may be applied in other scenarios. In an additional example, if a viewer wants to preferentially select video files that show a particular person, the viewer may configure the importance calculation module 218 to bias frames that show the face of the particular person to boost the video frame importance score of such video frames. In various embodiments, the importance calculation module 218 may store the feature values {F1, F2 . . . Fn} for a video file in the data store 226. The storage of the feature values for a video file may eliminate future duplicate analysis of the video file in scenarios in which different features are to be biased.

In at least one other embodiment, the importance calculation module 218 may be configured to apply a negative bias to a feature shown in a video frame. For example, a negative bias that is proportional to the amount of shakiness may be implemented by the importance calculation module 218 to lower the video frame importance score of the video frame proportionally to shakiness.

The video segmentation module 220 may segment a video file into multiple video sections based on importance. In some embodiments, the video segmentation module 220 may find a video section with a duration t that is shorter than the duration of the video file. In such embodiments, the video segmentation module 220 may calculate a window-mass that is the sum of the frame importance scores in video frames in a window that has (t*frame-rate) video frames of a video file. Such window-mass may be calculated successively in a shifting manner for all the video frames of the video file. Accordingly, the video segmentation module 220 may select a video frame with a highest window-mass as the center of the t-second long important video section. In other embodiments, the video segmentation module 220 may rely on the motion analysis module 216 to segment a video file into video sections based on motion data. Once the video segmentation module 220 has segmented a video file into video sections, the importance calculation module 218 may generate a section importance value for each video section in a similar manner as with respect to entire video files. In other words, the importance calculation module 218 may generate the section importance value based on the normalized frame importance scores of the video frames in the video section. In some instances, the importance calculation module 218 may also apply biasing to one or more feature scores during the generation of section importance values of video sections.

In various embodiments, each of the low-level analysis module 212, the high-level analysis module 214, and the importance calculation module 218 may store the scores, values, and other information that are obtained for the video sections and/or video files as associated metadata in the data store 226. Such metadata may be combined with other metadata that are associated the video files, such as date, location, number of online shares, etc.

The video ranking module 222 may rank video sections of a video file based on their section importance values. Alternatively or concurrently, the video ranking module 222 may rank video files according to their video importance values. The ranking may be from the most important to the least important, or vice versa. For each ranked video file, the video ranking module 222 may also store metadata regarding the video sections in the ranked video file. Such metadata may include the ranking of each video section, the start and end time of each video section, the duration of each video section, and the section importance value of each video section. In some embodiments, the video ranking module 222 may also calculate additional values for a video file or a video section. These values may include an importance density, which may reflect a percentage of the video frames in a video file or a video section with importance score that exceed an importance score threshold. These values may also include a quality density, which may reflect a percentage of frames in a video file or a video section with negative or positive features that exceed a corresponding threshold. Such negative or positive features may include shakiness, over exposure, under exposure, etc. The video ranking module 222 may store the multiple types of scores and other computed values that are used to generate rankings for individual video files and/or video sections as associated metadata in the data store 226.

Once a set of video files or video sections are ranked, the video ranking module 222 may display thumbnail image representations of the ranked video files or video sections. Accordingly, the selection of a thumbnail image representation may cause a media player 122 to play the corresponding video section, or other applications to provide the corresponding video section for sharing and/or editing.

The user interface module 224 may enable a user interact with the modules of the video analysis engine 102 via the interfaces 204. For example, the user interface module 224 may enable the user to select video files for importance analysis, tag human faces that are identified in video files with information, highlight faces of persons for positive feature score biasing, and/or selecting video files and video sections for playback by the media player 122 via thumbnail image representations. In some embodiments, the user may also use the user interface module 224 to select one or more of the low-level features or one or more of the high-level features of a video file for analysis by the video analysis engine 102.

The data store 226 may store data that are used by the various modules. In at least some embodiments, the data store 226 may store video files 228, ranked video files 230, ranked video sections 232, and/or metadata 234 associated with the ranked video files 230 and the ranked video sections 232. In other embodiments, the data store 226 may store data (e.g., importance scores) associated with video files or video sections that are used to rank the video files and video sections. The data store 226 may further store additional products and values that are generated by the modules, such as homograph transform matrices, feature scores, video importance values, section importance values, etc.

In some embodiments, one or more additional applications may be installed on the computing devices 104. Such applications may include a video editing application that is used to compile a new video file from selective video sections of an original video file. For example, such a video editing application may enable a user to select video sections with section importance values that exceeds a particular score threshold to be digitally combined together to create a highlight video file. The applications may also include online sharing application that enables a user to post a video file, video section, or a highlight video online. In additional embodiments, one or more other applications may be installed on the computing devices 104 to access the data stored in the data store 226 for the video files and the video sections via an application interface. Such application may access the data in order to use the analysis results in other ways. In other words, the video analysis engine 102 may function as a lower level service to provide data these applications.

Example Processes

FIGS. 4-7 describe various example processes for performing rule-based importance analysis of video files. The order in which the operations are described in each example process is not intended to be construed as a limitation, and any number of the described operations may be combined in any order and/or in parallel to implement each process. Moreover, the operations in each of the FIGS. 4-7 may be implemented in hardware, software, and a combination thereof. In the context of software, the operations represent computer-executable instructions that, when executed by one or more processors, cause one or more processors to perform the recited operations. Generally, computer-executable instructions include routines, programs, objects, components, data structures, and so forth that cause the particular functions to be performed or particular abstract data types to be implemented.

Figure 4:
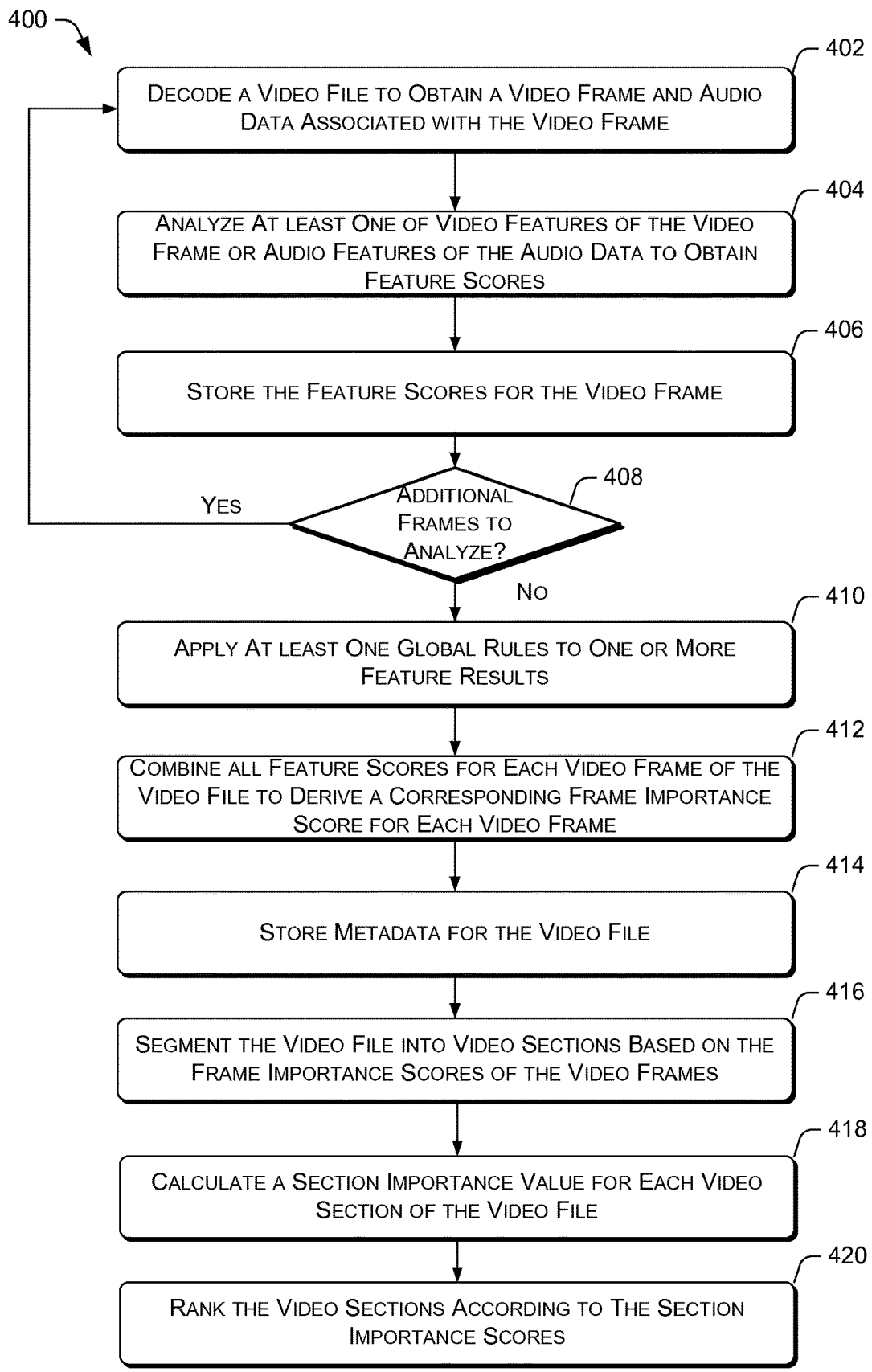
FIG. 4 is a flow diagram that illustrates an example process for using rule-based video analysis to analyze features in a video file in order to rank video sections of the video file based on their importance.

FIG. 4 is a flow diagram that illustrates an example process 400 for using rule-based video analysis to analyze features in a video file in order to rank video sections of the video file based on their importance. At block 402, the video analysis engine 102 may decode a video file, such as the video file 108(1), to obtain a video frame and audio data associated with the video frame. The video decoder module 210 may use various codecs to decode video files, such as H.264, MPEG-2, MPEG-4, etc. The associated audio data may have the same time duration as the video frame, e.g., 1/30th of a second or 1/60th of a second. However, in some embodiments, the video decoder module 210 may be configured to obtain a video frame without obtaining the associated audio data, or vice versa.

At block 404, the video analysis engine 102 may analyze at least one of the video features of the video frame or audio features of the audio data to obtain feature scores. The video analysis engine 102 may perform such analysis based on one or more local rules. In various embodiments, the one or more features that are analyzed may include high-level features and/or low-level features. For example, low-level features may include features such as exposure quality, saturation quality, shakiness of video frames, average brightness, color entropy, and/or histogram differences between video frames. High-level features may include features such as the quantities, positions, and/or facial features of faces that are detected in the video frames.

At block 406, the video analysis engine 102 may store the feature scores for the video frame as metadata for video frame. In various embodiments, the video analysis engine 102 may store the metadata in the data store 226. Such metadata may reduce or eliminate recurring analysis of video frames during future determination of the importance of corresponding video files or video sections that involves the same video frames.

At decision block 408, the video analysis engine 102 may determine whether there are additional frames of the video file to analyze. In other words, the video analysis engine 102 may determine whether all of the video frames and associated audio data of the video file have been decoded. If the video analysis engine 102 determines that there are additional frames to analyze ("yes" at decision block 408), the process 400 may loop back to block 402. At block 402, the video analysis engine 102 may obtain a subsequent video frame and associated data from the video file. However, if the video analysis engine 102 determines at decision block 408 that no additional video frames of the video file are to be analysis ("no" at decision block 408), the process 400 may proceed to block 410.

At block 410, the video analysis engine 102 may apply at least one global rule to one or more feature results. For example, the person whose face appears in a group with the highest group importance score may be considered a main character. Based on such information, the high-level analysis module 214 may apply a global rule to the video frames, such that the face importance scores of the video frames that show the main character may be further evaluated.

At block 412, the video analysis engine 102 may combine all feature scores for each video frame of the video file to derive a corresponding frame importance score for each video frame. For example, the video analysis engine 102 may average a set of normalized feature scores for each video frame to obtain a frame importance score for each video frame.

At block 414, the video analysis engine 102 may store metadata for the video file. The metadata may include the video frame importance scores of the video frames of the video file and/or the feature scores for each video frame.

At block 416, the video analysis engine 102 may segment the video file into video sections based on the video frame importance scores of the video frames. In some embodiment, the video analysis engine 102 may use the calculation of window-mass to segment the video file into video section. In other embodiments, the video analysis engine 102 may use the zero crossings for the zoom and vertical translation motions of the motion data captured in the video file to segment the video file into video sections.

At block 418, the video analysis engine 102 may calculate a section importance value for each video section of the video file. In various embodiments, the video analysis engine 102 may generate the section importance value based on the normalized frame importance scores of the video frames in the video section. In some instances, the importance calculation module 218 may also apply biasing to one or more feature scores during the generation of section importance values of video sections.

At block 420, the video analysis engine 102 may rank the video sections according to their section importance values. For example, the video sections may be ranked from the most importance to least importance, or vice versa. Once the video sections are ranked, the video analysis engine 102 may display thumbnail image representations of the video sections. The selection of a thumbnail image representation may cause a media player 122 to play the corresponding video section, or other applications to provide the corresponding video section for sharing and/or editing. Alternatively, the video analysis engine 102 may provide the ranking data to another application, such that the application may display the thumbnail representations of the ranked video sections.

Figure 5:
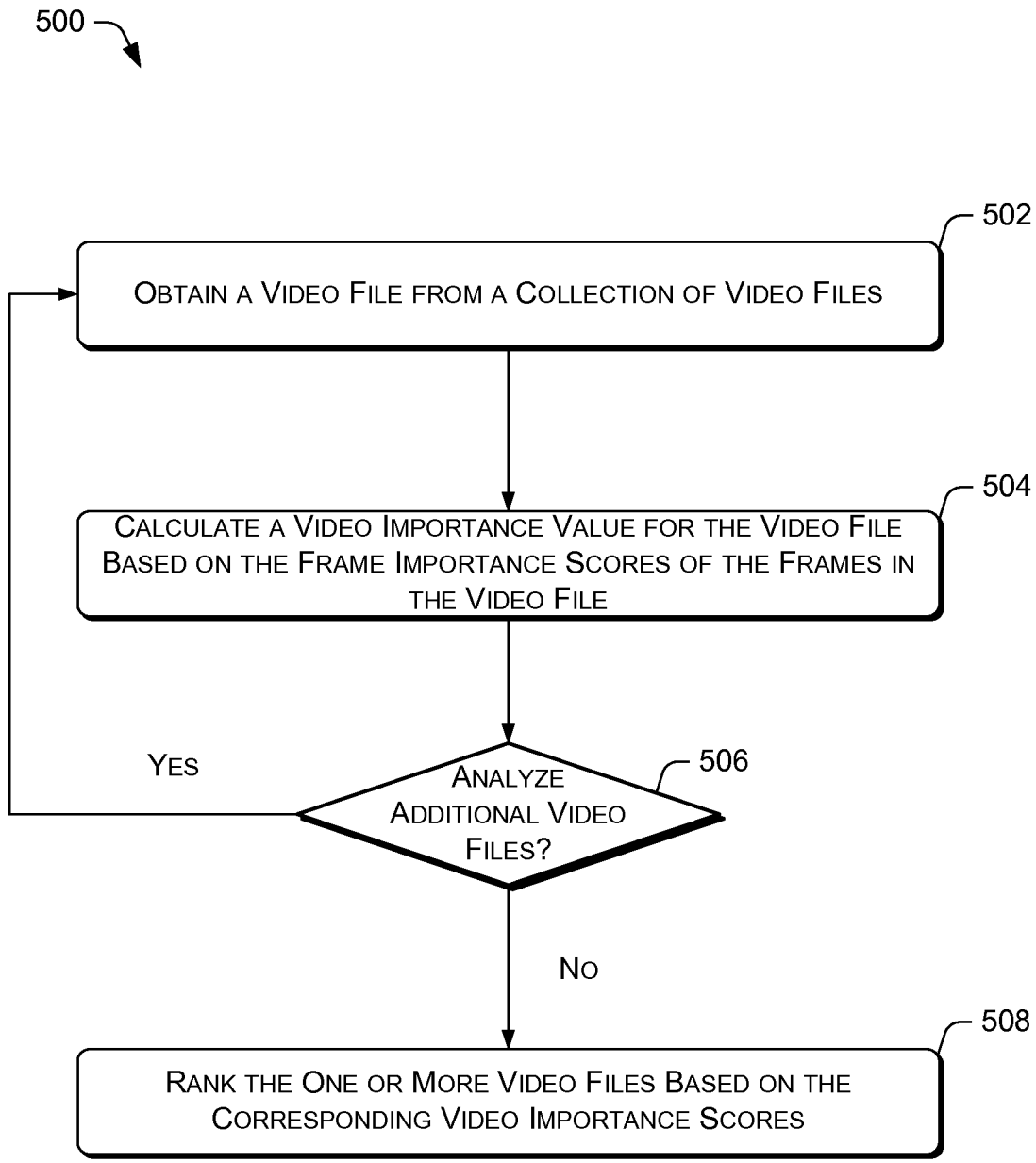
FIG. 5 is a flow diagram that illustrates an example process for using rule-based video analysis to analyze features of video files to rank the video files based on importance.

FIG. 5 is a flow diagram that illustrates an example process 500 for using rule-based video analysis to analyze features of video files to rank video files based on their importance. At block 502, the video analysis engine 102 may obtain a video file from a collection of video files, such as the video collection 106. In various embodiments, the video analysis engine 102 may obtain the video file based on a selection input from a user.

At block 504, the video analysis engine 102 may calculate a video importance value for the video file based on the video frame importance scores of the video frames in the video file. The video analysis engine 102 may compute each frame importance score for the video file as described in blocks 402-412 of the process 400 shown in FIG. 4. In various embodiments, the video analysis engine 102 may average the video frame importance scores to derive the video importance value for the video file. In alternative embodiments, the video analysis engine 102 may be configured to average the video frame importance scores of one or more video sections of the video file with the highest importance to derive the importance value for the video file. In some embodiments, the calculation of the video importance value for the video file may also include the biasing of one or more importance scores that are associated with frames.

At decision block 506, the video analysis engine 102 may determine whether additional video files are to be analyzed. The video analysis engine 102 may make such a determination based on a selection input received from a user. If the video analysis engine 102 determines that there are additional video files to be analyzed ("yes" at decision block 506), the process 500 may loop back to block 502. At block 502, the video analysis engine 102 may obtain another video file from the collection of video files for additional analysis.

However, if the video analysis engine 102 determines that there are no additional video files to be analyzed ("no" at decision block 506), the process 500 may proceed to block 508. At block 508, the video analysis engine 102 may rank the video files that are analyzed based on corresponding video importance values. For example, the video files may be ranked from the most importance to least importance, or vice versa. Once the video files are ranked, the video analysis engine 102 may display thumbnail image representations of the video files, in which a selection of a thumbnail image representation may cause a media player 122 to play the corresponding video file, or other applications to provide the corresponding video section for sharing and/or editing. Alternatively, the video analysis engine 102 may provide the ranking data to another application, such that the application may display the thumbnail representations of the ranked video files.

In some embodiments, the video analysis engine 102 may initially attempt to rank the video sections of a video file and/or the video files based on feature scores that are obtained for the high-level features of the video frames. In such embodiments, the video analysis engine 102 may resort to obtaining feature scores for both the high-level features and low-level features of the video frames to produce rankings when the initial attempt fails due to insufficient presence of high-level features in the video frames.

Figure 6:
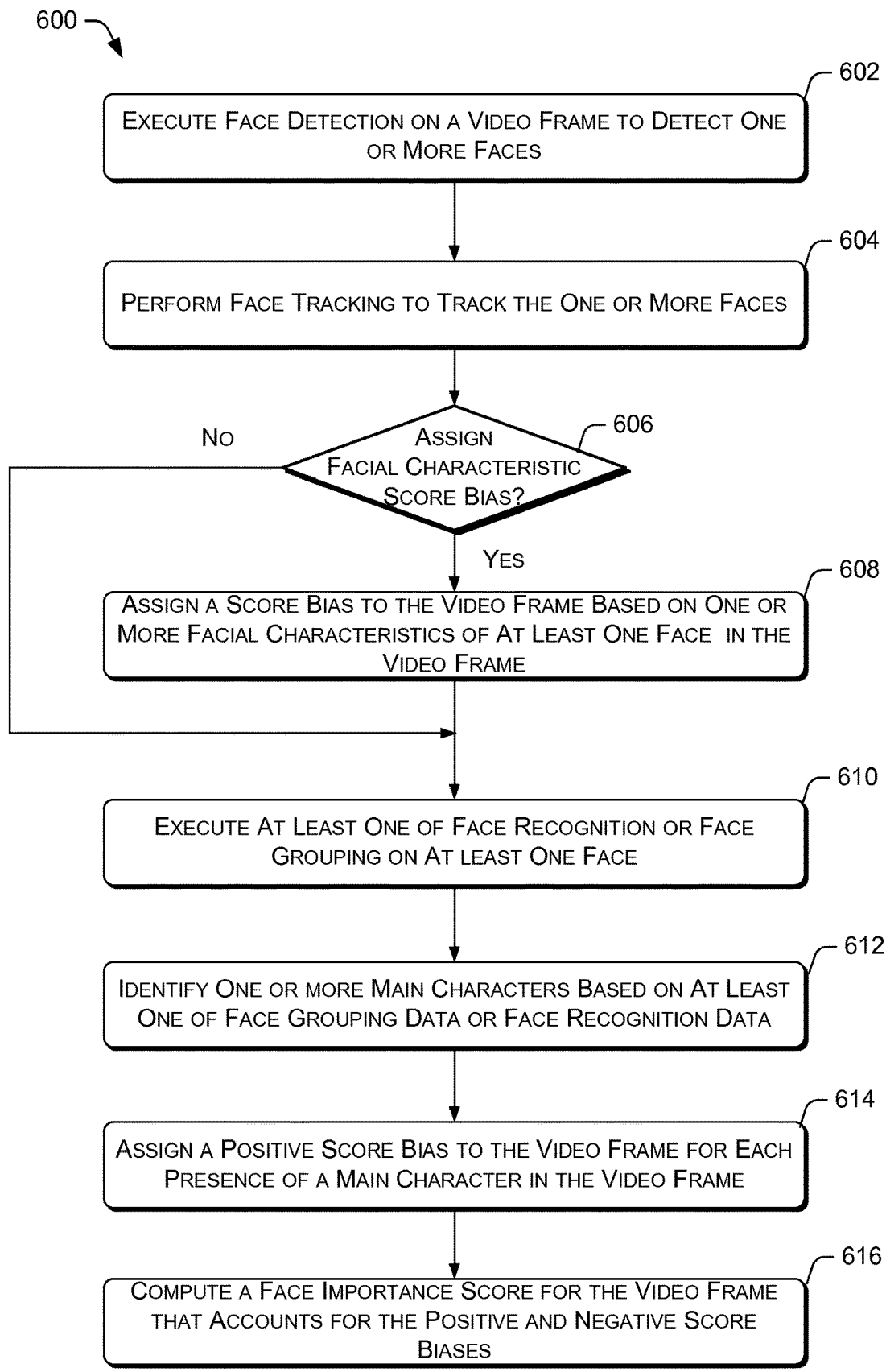
FIG. 6 is a flow diagram that illustrates an example process for computing a face importance score for a video frame.

FIG. 6 is a flow diagram that illustrates an example process 600 for computing a face importance score for a video frame. At block 602, the high-level analysis module 214 may execute face detection on a video frame to detect one or more faces. A detected face may be facing a camera that captured the video frame or sideways with respect to the camera. Based on this detection, the high-level analysis module 214 may generate a list of detected faces with their positions in the video frame, the area of the video frame covered by each face, and a detection confidence score for each face that indicate a confidence in the detection.

At block 604, the high-level analysis module 214 may perform face tracking to track the one or more faces. In various embodiments, the high-level analysis module 214 may track the human faces across multiple video frames. In this way, the high-level analysis module 214 may ascertain a set of faces that are present in a video file, as well as track the frequency that each face appears in the video file.

At block 606, the high-level analysis module 214 may determine whether facial characteristic-based score bias is to be assigned to a video frame. In various embodiments, the determination may be made based on whether one or more facial characteristics are present or absent in the video frame. Thus, if the high-level analysis module 214 determines that facial characteristic-based score bias is to be assigned ("yes" at decision block 606), the process 600 may proceed to block 608. However, if the high level analysis module 214 determines that facial characteristic-based score bias is not to be assigned ("no" at decision block 606), the process 600 may proceed directly to block 610.

At block 608, the high-level analysis module 214 may assign a score bias to the video frame based on facial characteristics of at least one face in the video frame. The facial characteristics may include a face size, face movement, and/or the presence or absence of certain facial features (e.g., smile or not, closed/open eyes, etc.) For example, a face in the video frame whose size is smaller than the minimum size threshold or greater than a maximum size threshold may result in the assignment of a negative score bias by the high-level analysis module 214. In another example, the importance score of a video frame showing a face of a particular person may be positively or negatively biased according to a distance of the face to the center of the video frame along an axis (e.g., x-axis or y-axis), such that a face that is closer to the center results in a higher importance for the video frame, and vice versa. The negative score bias may be a weight factor that decreases the face importance score for the video frame. In an additional example, the high-level analysis module 214 may assign a positive score bias for each face that is smiling and/or have eyes that are open.

At block 610, the high-level analysis module 214 may execute at least one of face recognition or face group on at least one face. In face grouping, the high-level analysis module 214 may group faces that are tracked to determine whether the faces that are detected on different video frames belong to the same person. In face recognition, the high-level analysis module 214 may use a facial recognition algorithm to match each human face that is detected in a video frame to a known identity of a person.

At block 612, the high-level analysis module 214 may identify one or more main characters based on at least one of face tracking data or face recognition data. For example, the number of faces in each group is directly proportional to the prevalence of the face in the video file. Further, a higher prevalence indicates a higher importance of the person with the face, and vice versa. Accordingly, the face belonging to a group with a highest number of faces may be determined by the high-level analysis module 214 as belonging to the main character. In another example, the a main character may be identified when a face designated as belonging to a main character is detected by as being present in the video frame by the facial recognition algorithm.

At block 614, the high-level analysis module 214 may assign a positive score bias to the video frame for each presence of a main character in the video frame. The positive feature score may elevate a face importance score that is calculated for the video frame. The positive score bias may be a weight factor that increases the face importance score for the video frame.

At block 616, the high-level analysis module 214 may compute a face importance score for the video frame. The face importance score may be calculated in proportional to the size and/or movement of each face in the video frame. The computation of the face importance score may be calculated based on the positive and/or negative score biases.

Figure 7:
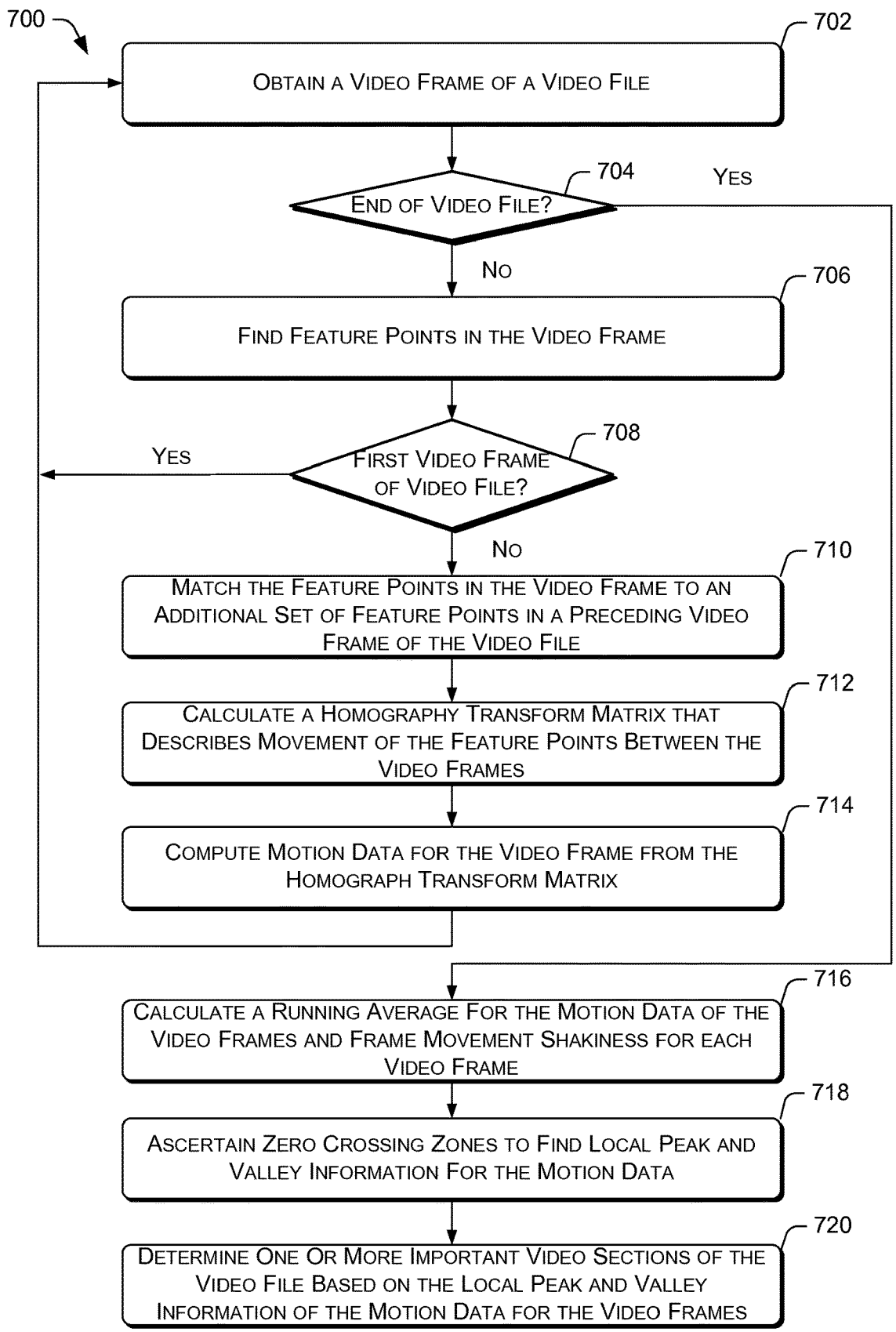
FIG. 7 is a flow diagram that illustrates an example process for determining important video sections within a video by analyzing the movement of feature points.

FIG. 7 is a flow diagram that illustrates an example process 700 for determining importance sections within a video by analyzing the movement of feature points. At block 702, the motion analysis module 216 may obtain a video frame of a video file, such as the video file 108(1). The video decoder module 210 may have decoded the video frame from the video file for analysis by the motion analysis module 216.

At decision block 704, the motion analysis module 216 may determine whether the end of the video file is reached. If the motion analysis module 216 determines that the end of the video file has not been reached ("no" at decision block 704), the process 700 may continue to block 706.

At block 706, the motion analysis module 216 may detect feature points in the video frame. In various embodiments, the motion analysis module 216 may down sample the video frame and create a pyramid of down sampled images of smaller dimensions. The down sampled images are then compared by the motion analysis module 216 to determine common points (i.e., feature points) among the down sampled images.

At decision block 708, the motion analysis module 216 may determine whether the video frame is the first video frame of the video file. Accordingly, if the motion analysis module 216 determines that the video frame is the first video frame ("yes" at decision block 708), the process 700 may loop back to block 702. Upon returning to block 702, the motion analysis module 216 may obtain another video frame of the video file. However, if the motion analysis module 216 determines that the video frame is not the first video frame of the video ("no" at decision block 708), the process 700 may proceed to block 710.

At block 710, the motion analysis module 216 may match the feature points in the video frame to an additional set of feature points in a preceding video frame of the video file. In various embodiments, the motion analysis module 216 may perform the matching by determining a transform that aligns the two adjacent frames such that a maximum number of feature points match. In at least one embodiment, the transform may be performed using geometric matching that is an implementation of robust parameter estimation.

At block 712, the motion analysis module 216 may calculate a homography transform matrix that describes movement of the feature points between the video frames. In at least some embodiments, the motion analysis module 216 may use a Random Sampling and Consensus (RANSAC) algorithm to obtain the homography transform matrix.

At block 714, the motion analysis module 216 may compute motion data for the video frame from the homograph transform matrix. In various embodiments, the motion analysis module 216 may extract the magnitude and direction of the zooming and vertical translation components using the homograph transform matrix. These magnitudes and directions represent intentional movement of a camera that recorded in the two adjacent frames. Subsequently, the process 700 may loop back to block 702, so that the motion analysis module 216 may obtain another video frame of the video file for processing.

Returning to decision block 704, if the motion analysis module 216 determines that the end of the video file is been reached ("yes" at decision block 704), the process 700 may continue to block 716. At block 716, the motion analysis module 216 may calculate a running average for the motion data of the video frames and frame movement shakiness for each video frame. The motion data of the one or more video frames of the video file may be combined prior to the calculation. In various embodiments, the motion analysis module 216 may determine shakiness movement of the camera that recorded the video frames by calculating motion data running average of the movement vectors of the video frames, and subtract the intentional movement of the camera from the motion data running average. The calculation of the motion data running average suppresses local variance and preserve long term trends that represent the intentional movement. In other words.

At block 718, the motion analysis module 216 may ascertain zero crossing zones to find local peak and valley information, i.e., local maxima and minima, for the motion data. The local peak and valley information may indicate scene transition points for the video file.

At block 720, the motion analysis module 216 may segment the video file into video sections based on the local peak and valley information. Furthermore, the motion analysis module 216 may combine and average the magnitudes for zoom and pan motion for each video section. The amount of acceleration represented by the average of the magnitudes of zoom and pan motion for a video section may be used by the motion analysis module 216 to assign a motion importance score to the video section. Subsequently, the motion analysis module 216 may designate one or more video sections that have the highest motion importance scores as importance sections of the video file.

The use of the techniques described herein may enable a user to rank video files based on their importance to the user. Based on such ranking, the user may decide which video files to keep and which video files to delete. In some instances, the user may also use the rankings of the video files to determine whether to post specific video files on an online sharing website. The techniques described herein may also present thumbnail image representations that represent importance sections of a video file, such that the user may tell at a glance the interesting portions of a video file. Such information may assist the user in editing the video file to improve content quality or highlight particular sections of the video file.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

What is claimed is:

1. One or more computer storage media storing computer-executable instructions that are executable to cause one or more processors to perform acts comprising:
   decoding a video file to obtain at least one of a video frame or audio data associated with the video frame;
   analyzing one or more high-level features of the at least one of the video frame or the audio data associated with the video frame based on at least one of a local rule or a global rule to obtain one or more feature scores for the video frame, the one or more high-level features including at least one feature that is related to a movement or a position of a human face in the video frame;
   combining the one or more feature scores of the video frame to derive a frame importance score for the video frame; and
   segmenting the video file into video sections of different section importance values based at least on the frame importance scores of the video frame and other frame importance scores of additional video frames of the video file.

2. The one or more computer storage media of claim 1, further comprising ranking the video sections according to the section importance values.

3. The one or more computer storage media of claim 1, further comprising:
   calculating a video importance value for the video file based at least on the frame importance scores of all video frames in the video file; and
   ranking the video file relative to additional video files based at least on the video importance value of the video file and other video importance values of the additional video files.

4. The one or more computer storage media of claim 3, further comprising storing metadata regarding one or more video frames in the video file, the metadata including one or more feature scores of a video frame.

5. The one or more computer storage media of claim 1, wherein the local rule affects an assignment of feature importance for the video frame and the global rule affects the assignment of feature importance for multiple video frames in the video file that includes the video frame.

6. The one or more computer storage media of claim 1, wherein the one or more high-level features includes at least one of a position of a human face in the video frame, an occurrence frequency of the human face over multiple video frames, frame saliency of the video frame, an audio power of the audio data associated with the video frame, or an audio type of the audio data associated with the video frame.

7. The one or more computer storage media of claim 6, wherein the one or more low-level features includes at least one of a frame exposure quality of the video frame, a frame saturation quality of the video frame, a frame hue variety of the video frame, a frame shakiness of the video frame, an average brightness of the video frame, a color entropy of the video frame, or a histogram difference between the video frame and an adjacent video frame.

8. The one or more computer storage media of claim 6, wherein analysis of frame saliency of the video frame includes:
   calculating a running average of motion data of the video frames;
   determining a shakiness movement of the video frames;
   including the shakiness movement in the running average;
   determining an intentional movement of the video frames; and
   subtracting the intentional movement from the running average.

9. The one or more computer storage media of claim 1, wherein the analyzing further includes analyzing one or more low-level features of the video frame, and wherein the combining further includes combining the feature scores for the high-level features and the low-level features of the video frame to derive the frame importance score for the video frame.

10. The one or more computer storage media of claim 1, wherein the analyzing includes:
    executing face detection on the video frame to detect one or more human faces;
    executing face tracking to track the one or more human faces;
    assigning a negative or a positive score bias to the video frame based at least on a face size, a face position, or one or more facial feature of at least one human face in the video frame, the one or more facial features including an absence or presence of at least one of a smile or open eyes in the at least one human face;
    executing at least one of face recognition or face grouping on at least one human face of the one or more human faces;
    identifying one or more main characters based at least on at least one of face grouping data or face recognition data;
    assigning an additional positive score bias to the video frame for a presence of a main character in the video frame; and
    computing a face importance score for the video frame that accounts for the negative score bias and the positive score bias.

11. A computer-implemented method, comprising:
    decoding a video file to obtain at least one of a video frame or audio data associated with the video frame;
    analyzing one or more features of at least one of the video frame or the audio data associated with the video frame based on at least one of a local rule or a global rule to obtain one or more feature scores for the video frame;

combining the one or more feature scores of the video frame to derive a frame importance score for the video frame;

calculating a video importance value for the video file based at least on the frame importance scores of the video frame and other frame importance scores of additional video frames of the video file;

segmenting the video file into video sections of different section importance based at least on the frame importance scores of video frames in the video file data associated with a plurality of video frames in the video file; and ranking the video file relative to additional video files based at least on video importance values of the video file and other video importance values of the additional video files.

12. The computer-implemented method of claim 11, wherein the local rule affects an assignment of feature importance for the video frame and the global rule affects the assignment of feature importance for multiple video frames in the video file that includes the video frame.

13. The computer-implemented method of claim 11, wherein the segmenting the video file based at least on the motion data associated with a plurality of video frames in the video file includes:

detecting feature points in the video frame of the video file by detecting common points between multiple down sampled images of the video frame;

matching the feature points in the video frame to an additional set of feature points in a preceding video frame of the video file;

calculating a homography transform matrix that describes movement of the feature points between the video frames;

computing motion data for the video frame from the homography transform matrix, the motion data including magnitude and direction of zooming and vertical translation components of the movement of the feature points;

combining the motion data for the video frame with motion data for one or more remaining frames in the video file;

calculating running averages for the motion data of the video frames in the video file;

ascertaining zero crossing zones to find local peak and valley information for the motion data based at least on the running averages; and determining video sections of the video file based at least on the local peak and valley information of the motion data.

14. The computer-implemented method of claim 11, further comprising:

calculating section importance values of the video sections based at least on frame importance scores of corresponding video frames in the video sections; and ranking the video sections according to the section importance values.

15. The computer-implemented method of claim 11, wherein the one or more features includes frame saliency of the video frame, an audio power of the audio data associated with the video frame, an audio type of the audio data associated with the video frame, a frame exposure quality of the video frame, a frame saturation quality of the video frame, a frame hue variety of the video frame, a frame shakiness of the video frame, an average brightness of the video frame, a color entropy of the video frame, or a histogram difference between the video frame and an adjacent video frame.

16. The computer-implemented method of claim 11, wherein the analyzing includes:

executing face detection on a video frame to detect one or more human faces;

executing face tracking to track the one or more human faces;

assigning a negative score bias or positive score bias to the video frame based at least on a face size, a face position, or one or more facial features of at least one human face in the video frame, the one or more facial features including an absence or presence of at least one of a smile or open eyes in the at least one human face;

executing at least one of face recognition or face grouping on at least one human face of the one or more human faces;

identifying one or more main characters based at least on at least one of face grouping data or face recognition data;

assigning a positive score bias to the video frame for a presence of a main character in the video frame; and computing a face importance score for the video frame that accounts for the negative score bias and the positive score bias.

17. A system, comprising:

one or more processors;

a memory that includes a plurality of computer-executable components that are executable by the one or more processors to perform a plurality of actions, the plurality of actions comprising:

decoding a video file to obtain at least one of a video frame or audio data associated with the video frame;

analyzing one or more features of the at least one of the video frame or the audio data associated with the video frame based on at least one of a local rule or a global rule to obtain one or more feature scores for the video frame, the local rule affects an assignment of feature importance for the video frame and the global rule affects the assignment of feature importance for multiple video frames in the video file that includes the video frame;

combining the one or more feature scores of the video frame to derive a frame importance score for the video frame;

segmenting the video file into video sections of different section importance based at least on the frame importance scores of video frames in the video file associated with a plurality of video frames in the video file; and ranking the video sections according section importance values of the video sections that are calculated based at least on the frame importance scores of the video frame and the additional video frames in the video file.

18. The system of claim 17, further comprising:

calculating a video importance value for the video file based at least on the frame importance scores of the video frames in the video file; and ranking the video file relative to additional video files based at least on the video importance value of the video file and other video importance values of additional video files.

19. The system of claim 17, wherein the segmenting the video file includes:

detecting feature points in the video frame of the video file by detecting common points between multiple down sampled images of the video frame;

matching the feature points in the video frame to an additional set of feature points in a preceding video frame of the video file;

calculating a homography transform matrix that describes movement of the feature points between the video frames;

computing motion data for the video frame from the homography transform matrix, the motion data including magnitude and direction of zooming and vertical translation components of the movement of the feature points;

combining the motion data for the video frame with motion data for one or more remaining frames in the video file;

calculating running averages for the motion data of the video frames in the video file;

ascertaining zero crossing zones to find local peak and valley information for the motion data based at least on the running averages; and determining video sections of the video file based at least on the local peak and valley information of the motion data.

20. The system of claim 17, further comprising combining multiple video sections into a highlight video file of the video file.

* * * * *